United States Patent
Kokkinen et al.

(10) Patent No.: US 8,804,957 B2
(45) Date of Patent: Aug. 12, 2014

(54) AUTHENTICATION KEY GENERATION ARRANGEMENT

(75) Inventors: Heikki Juhani Kokkinen, Helsinki (FI); Mika Petri Olavi Rinne, Espoo (FI); Pekka Johannes Laitinen, Helsinki (FI)

(73) Assignee: Nokia Corporation, Espoo (FI)

( * ) Notice: Subject to any disclaimer, the term of this patent is extended or adjusted under 35 U.S.C. 154(b) by 588 days.

(21) Appl. No.: 12/749,015

(22) Filed: Mar. 29, 2010

(65) Prior Publication Data

US 2011/0235802 A1    Sep. 29, 2011

(51) Int. Cl.
*H04K 1/00* (2006.01)
*H04L 29/06* (2006.01)
*H04W 12/04* (2009.01)
*H04W 12/06* (2009.01)

(52) U.S. Cl.
CPC ............ *H04L 63/205* (2013.01); *H04W 12/04* (2013.01); *H04W 12/06* (2013.01); H04L 2463/061 (2013.01)
USPC .......................................... 380/247; 380/44

(58) Field of Classification Search
CPC .......... H04L 2463/061; H04L 63/205; H04W 12/04; H04W 12/06
USPC ............. 713/168, 170, 171; 380/44, 247, 277
See application file for complete search history.

(56) References Cited

U.S. PATENT DOCUMENTS

| | | | |
|---|---|---|---|
| 7,284,062 B2 * | 10/2007 | Krantz et al. ................. | 709/229 |
| 7,907,734 B2 * | 3/2011 | Nishida et al. ................ | 380/277 |
| 8,166,300 B2 * | 4/2012 | Bjorkengren et al. ........ | 713/170 |
| 2007/0162751 A1 | 7/2007 | Braskich et al. | |

FOREIGN PATENT DOCUMENTS

| | | | |
|---|---|---|---|
| EP | 1427163 A2 * | 6/2004 | |
| EP | 1427163 | 9/2004 | |
| EP | 1843508 | 10/2007 | |
| EP | 1855223 | 11/2007 | |

OTHER PUBLICATIONS

PCT International Search Report dated Jul. 11, 2011 in corresponding International Application No. PCT/FI2011/050233.
PCT Written Opinion of the International Searching Authority dated Jul. 11, 2011 in corresponding International Application No. PCT/FI2011/050233.
"IEEE Standard for Information technology—Telecommunications and information exchange between systems—Local and metropolitan area networks—Specific requirements—Part 11: Wireless LAN Medium Access Control (MAC) and Physical Layer (PHY) Specifications", IEEE Std 802.11™-2007 (Revision of IEEE Std 802.11-1999), Jun. 12, 2007, cover page and pp. 123, 125, 198, 200 and 218 (6 pages total).
"3rd Generation Partnership Project; Technical Specification Group Services and System Aspects; 3GPP System Architecture Evolution (SAE); Security architecture; (Release 9)", 3GPP TS 33.401, V9.1.0 (Sep. 2009), pp. 1-100.
Extended European Search Report for European App. No. 11762069.0—Date of Completion of Search: Nov. 22, 2013—10 pages.

(Continued)

*Primary Examiner* — Samson Lemma
(74) *Attorney, Agent, or Firm* — Locke Lord LLP (57) ABSTRACT

Authentication key generation for local area network communication, including: participating in communication of a message comprising a cipher suite selection type indicating cellular network compatible cipher suite; and creating cellular network compatible authentication keys according to said cipher suite selection type.

17 Claims, 5 Drawing Sheets

(56) References Cited

OTHER PUBLICATIONS

Walker, J. et al., "802.11i Overview—Date: Feb. 9, 2005", 108 pages.

"IEE Std. 802.11—2007—Part 11: Wireless LAN Medium Access Control (MAC) and Physical Layer (PHY) Specifications"—Jun. 12, 2007, pp. 155-249.

Changhua H. et al., "Security Analysis and Improvements for IEEE 802.11i", Electrical Engineering and Computer Science Departments, Jan. 12, 2005, 19 pages.

Furlong, A. et al., "New cipher in RSN IE", Nov. 27, 2009, 2 pages.

\* cited by examiner

AUTHENTICATION KEY GENERATION ARRANGEMENT

TECHNICAL FIELD

The present invention generally relates to authentication key generation in wireless communications.

BACKGROUND ART

Different authentication and security mechanisms are used in wireless communications. Wireless communication may concern cellular networks or wireless local area networks.

As an example of authentication protocols that are used in a cellular network, 3GPP Long Term Evolution (LTE) provides Authentication and Key Agreement (AKA) protocol. As an example of authentication protocols that are used in a wireless local area network (WLAN), IEEE 802.11 provides Extensible Authentication Protocol Over LAN (EAPOL) protocol.

SUMMARY

According to a first example aspect of the invention there is provided a method comprising:
performing authentication key generation for local area network communication, said authentication key generation for the local area network communication comprising:
participating in communication of a message comprising a cipher suite selection type indicating cellular network compatible cipher suite; and
creating cellular network compatible authentication keys according to said cipher suite selection type.

According to a second example aspect of the invention there is provided an apparatus comprising:
at least one processor; and
at least one memory including computer program code;
the at least one memory and the computer program code configured to, with the at least one processor, cause the apparatus to:
perform authentication key generation for local area network communication, said authentication key generation for the local area network communication comprising:
participating in communication of a message comprising a cipher suite selection type indicating cellular network compatible cipher suite; and
creating cellular network compatible authentication keys according to said cipher suite selection type.

According to a third example aspect of the invention there is provided a computer program comprising computer executable program code which, when executed by at least one processor of an apparatus, causes the apparatus to perform:
performing authentication key generation for local area network communication, said authentication key generation for the local area network communication comprising:
participating in communication of a message comprising a cipher suite selection type indicating cellular network compatible cipher suite; and
creating cellular network compatible authentication keys according to said cipher suite selection type.

According to yet another example aspect of the invention there is provided a memory medium embodying the computer program of the third example aspect.

According to yet another example aspect of the invention there is provided a signal or message of local area network authentication procedure, wherein the signal carries a cipher suite selection type indicating cellular network compatible cipher suite.

According to yet another example aspect of the invention there is provided an apparatus comprising:
means for performing authentication key generation for local area network communication;
means for participating in communication of a message comprising a cipher suite selection type indicating cellular network compatible cipher suite; and
means for creating cellular network compatible authentication keys according to said cipher suite selection type.

Different non-binding example aspects of the present invention have been illustrated in the foregoing.

BRIEF DESCRIPTION OF THE DRAWINGS

The invention will be described, by way of example only, with reference to the accompanying drawings, in which.

DETAILED DESCRIPTION

In the following, the term authentication keys is used. The authentication keys may be of different types, like master keys, derived keys in a sequence of keys or such. Typically any of these keys may be called security keys or ciphering keys or just shortly keys. The keys may also be called integrity protection keys, for example in case of RRCint keys. With regard to sessions, the keys may be called session keys. Without loss of generality, in this application, any of these keys in different roles may be called authentication keys.

Figure 1A:
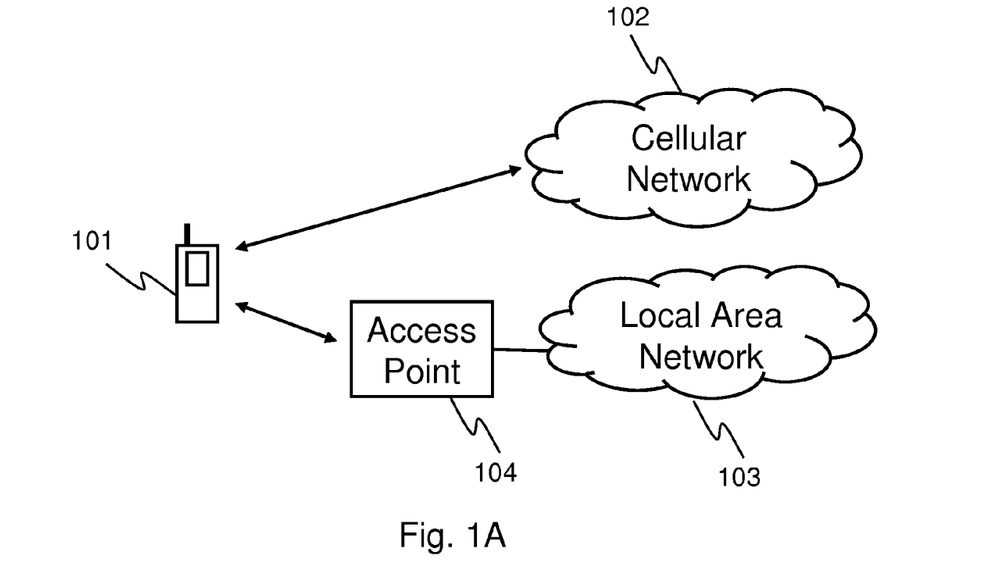
FIG. 1A shows a system according to an example embodiment.

FIG. 1A shows a system according to an example embodiment. The system comprises a user equipment (UE) 101, such as a mobile phone or some other communication apparatus, a cellular network 102, a local area network 103, and an access point (AP) providing access to the local area network 103. The communication device 101 is capable of connecting to both the cellular 102 and the local area 103 network via an air interface. The access point 104 provides access to the local area network 103. The cellular network 102 may be for example LTE or UMTS network according to 3GPP specifications and the local area network 103 may be for example a wireless local area network according to IEEE 802.11. The local area network may also be defined according to LTE or UMTS specifications by the 3GPP in the future. An access point that provides access to the local area network may be a kind of access point according to IEEE 802.11, or it may be a local area node or a home node or a base station node according to the applicable 3GPP specifications. It is understood that IEEE 802.11 or 3GPP may provide changes to the functionality of these nodes in the future releases, however that does not limit the applicability of embodiments of this invention. Currently such local area nodes in 3GPP are called e.g. femto base stations, or home node B (HNB), home evolved node B (HeNB) and such. These could also include corporate networks or networks in public buildings like airports, hotels etc. In this application, access point, is used as a term for a node that covers any of functions that provide access to a local area network.

According to an example embodiment a new local area communication mechanism with a new authentication mechanism is introduced. The new communication mechanism may be called optimized local access (OLA) or local area evolution (LAE).

In an example embodiment the OLA authentication architecture is a combination of 3GPP LTE and IEEE technologies.

In an example embodiment the OLA system architecture is similar to IEEE 802.11 system architecture and the OLA physical and link layer frame structure is similar to LTE frame structure. The link layer security in OLA may be based on the LTE specification. The key agreement protocols in OLA may be based on the IEEE specification.

In an example embodiment the AKA system defined for LTE and the EAPOL system defined for IEEE 802.11 are combined to provide a new authentication mechanism for the OLA system.

In an example embodiment a new cipher suite type is introduced for EAPOL key exchange. The new cipher suite type indicates use of LTE compatible suite which may use Krrcint, Krrcenc and Kupenc, which are defined in 3GPP TS 33.401 V9.1.0 (2009-09) section 6.2 pages 23-26.

In a more generalized example embodiment a new cipher suite type is introduced for local area network key exchange. The new cipher suite type indicates use of a cellular network compatible cipher suite. It must be noted that at least one new cipher suite type is introduced and that there may be more than one cellular network compatible cipher suites.

Figure 1B:
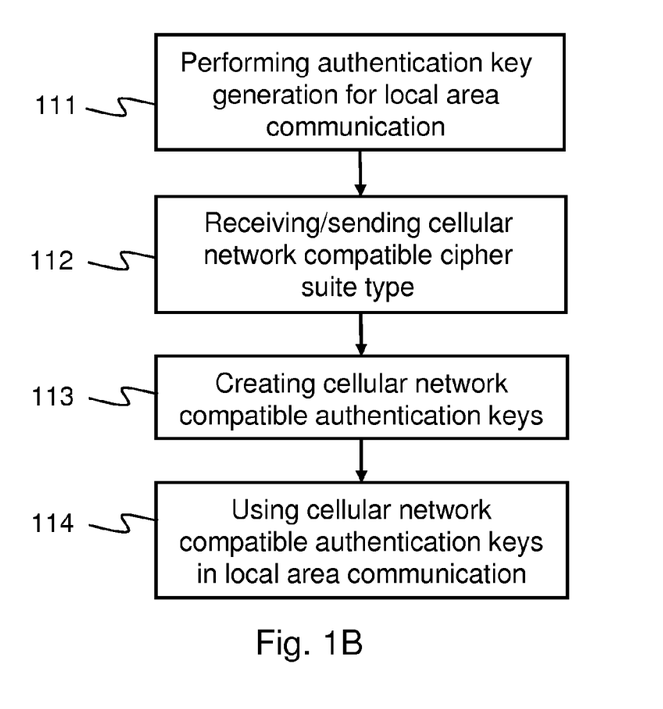
FIG. 1B shows a flow chart according to an example embodiment.

FIG. 1B shows a flow chart according to an example embodiment. In phase 111 authentication key generation is performed for local area communication. In phase 112, a cellular network compatible cipher suite type is sent or received. For example the access point 104 of FIG. 1A may send the cellular network compatible cipher suite type and the user equipment 101 may receive the cellular network compatible cipher suite type. Then in phase 113 both the sender and the receiver of the cellular network compatible cipher suite type create cellular network compatible authentication keys. In an example embodiment the keys that are created are Krrcint, Krrcenc, and Kupenc.

In phase 114, the cellular network compatible authentication keys are then used in local area communication for example for encrypting, decrypting and integrity calculation and checking. It must be noted that also other keys than the cellular network compatible keys may be used in the local area communication. For example, group keys may be used.

The new cipher suite type may be used at any point in which a cipher suite is selected or communicated. The new cipher suite type may be used for example During finding the system,
During connection initialization,
During data transfer, or
During/after handover.

In an example embodiment, if an UE context may be transferred between different access points in a local area network, also a key change algorithm and use of cellular network compatible cipher suite may take place in these cases.

The new cipher suite type may be communicated on a broadcast channel or on a traffic channel as appropriate. The new cipher suite type may be communicated in a key frame, a beacon frame, or a probe frame. It must be noted that sending and receiving the cipher suite type does not necessarily trigger immediate generation of the cellular network compatible keys. Instead the keys may be generated in a later phase as appropriate.

In an example embodiment the new cipher suite type is used in communication between a user equipment and an access point providing access to a local area network or in communication between user equipment.

Figure 2:
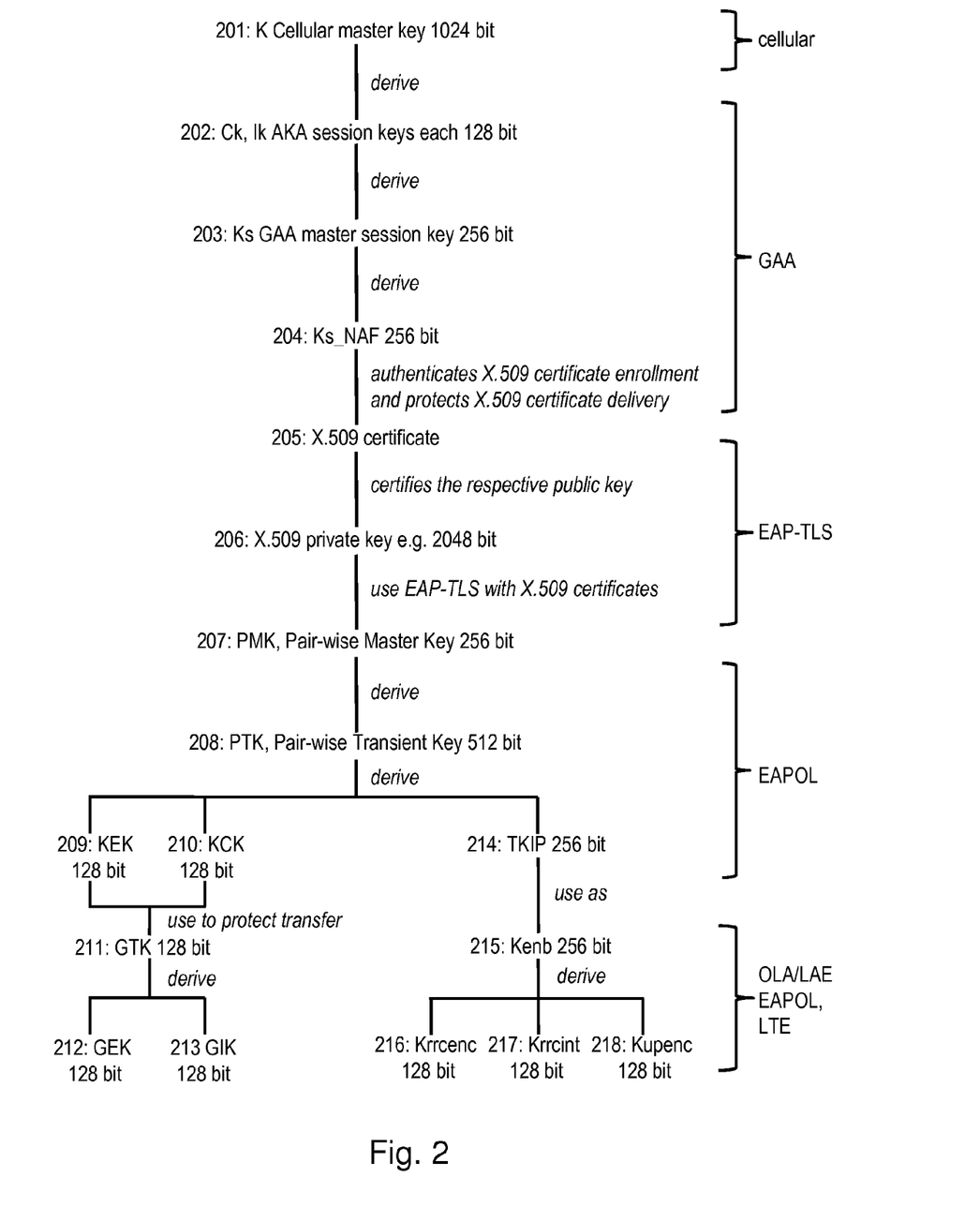
FIG. 2 shows key hierarchy according to an example embodiment.

FIG. 2 shows key hierarchy according to an example embodiment.

In user equipment, there is locally stored 1024 bit long cellular master key K, 201. GAA (generic authentication architecture) is used to derive an X.509 client certificate from USIM (universal subscriber identity module) authentication. The cellular master key K is used to derive 128 bit long AKA session keys Ck and Ik, 202. The AKA session keys Ck and Ik are used to derive 256 bit long GAA master session key Ks, 203. The GAA master session key Ks is used to derive 256 bit long Ks_NAF key, 204. Keys Ks_NAF key authenticates X.509 certificate enrollment and protects X.509 certificate delivery. X.509 certificate, 205, certifies the respective public key.

X.509 private key, 206, is created locally, and EAP-TLS (EAP-transport layer security) protocol is used with X.509 certificates.

EAPOL protocol is used to create encryption and integrity keys. 256 bit long pair-wise master key PMK, 207, is created locally. The pair-wise master key PMK is used to derive 512 bit long pair-wise transient key PTK, 208.

Local key creation here means that keys are created in user equipment or an access point (or other applicable apparatus or node) without exchange of key information with another node. More specifically, the key may be created inside a security module, protected hardware, protected memory or encrypted software or any combination thereof.

The pair-wise transient key PTK is used to derive 128 bit long EAPOL-Key encryption key KEK, 209, and 128 bit long EAPOL-Key confirmation key KCK, 210. KEK and KCK are used to protect transfer of 128 bit long group temporal key GTK. The group temporal key GTK is used to derive 128 bit long group encryption key GEK, 212, and 128 bit long group integrity key GIK, 213.

256 bit long application specific temporary key TKIP (bits 256-511 of PTK), 214, is used in a similar way as Kenb or Kasme in LTE, 215. Kasme is a part of an evolved packet system authentication vector and may be the authentication and key agreement protocol. The Kenb is based on the Kasme key. The TKIP bits are set to values representing Kenb key that have a meaning and relationship regarding the cellular key creation.

Kenb is used to derive 128 bit long Krrcenc, 216; 128 bit long Krrcint, 217; and 128 bit long Kupenc, 218. Krrcenc is a key that may be used for ciphering of RRC (radio resource control) traffic, Krrcint is a key that may be used for integrity protection of RRC traffic, and Kupenc is a key that may be used for ciphering user data. Kenb, Krrcenc, Krrcint, and Kupenc may be for example the keys defined in 3GPP TS 33.401 V9.1.0 (2009-09) section 6.2 pages 23-26.

Figure 3:
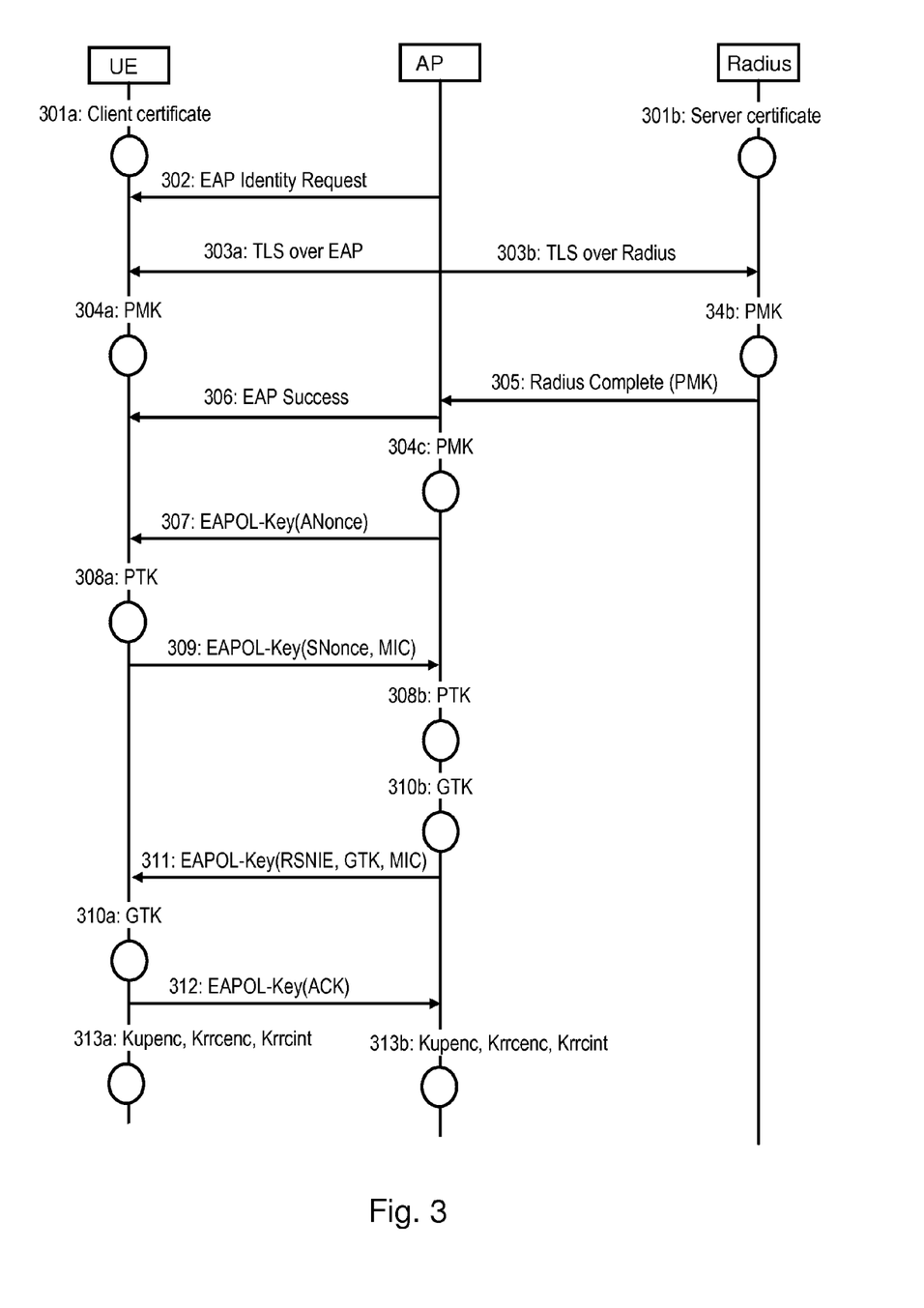
FIG. 3 shows a procedure according to an example embodiment.

FIG. 3 shows a procedure according to an example embodiment.

In initial phase there is a client certificate 301a in a user equipment and a server certificate 301b in a radius server. An access point sends EAP identity request message 302 to the UE and initiates TLS, TLS over EAP 303a towards the UE and TLS over Radius towards the Radius server. The UE and the Radius server generate pair-wise master key PMK, 304a and 304b. The Radius server send the PMK to the AP in a radius complete message, 305. That is, now the AP has the PMK, 304c, as well. The AP send EAP success message 306 to the UE.

Then the AP sends to the UE an EAPOL-Key message with ANonce (authenticator nonce) 307. The UE generates pair-wise transient key PTK 308a and sends to the AP an EAPOL-Key message with SNonce (supplicant nonce) and MIC (message integrity code) 309. The AP generates pair-wise transient key PTK 308b and group temporal key GTK 309b and sends to the UE an EAPOL-Key message with RSNIE (robust security network information element), GTK and MIC 311. As a result also the UE has the GTK, 310a. The UE sends to the AP an EAPOL-Key acknowledgement message 312.

The RSNIE in the EAPOL-Key message 311 indicates cellular network compatible cipher suite. Therefore the UE and the AP generate cellular network compatible keys Kupenc, Krrcenc, and Krrcint, 313a and 313b.

Figure 4A:
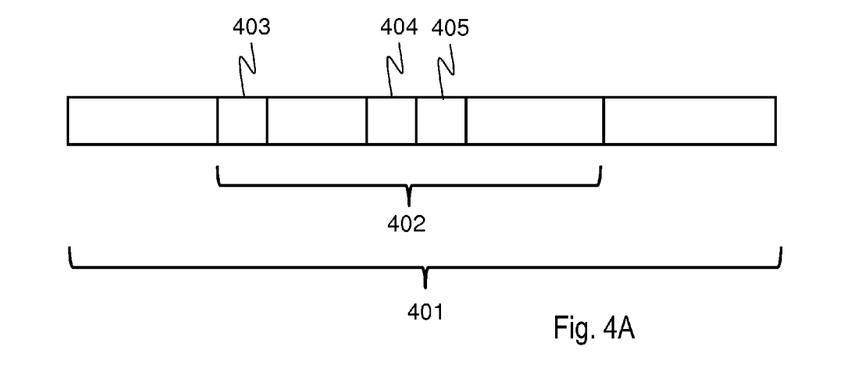
FIG. 4A shows a message according to an example embodiment.

An example embodiment provides a message of local area network authentication protocol carrying a cipher suite type, which indicates use of a cellular network compatible cipher suite. FIG. 4A shows an example of such message 401. The message may be for example the message 311 of FIG. 3.

The message 401 comprises an information element 402. The information element 402 may be for example robust security network information element (RSNIE). The message 401 may comprise other information elements or parts as well but they are not shown here. The information element 402 comprises an identifier field 403, a cipher suite count field 404, and a cipher suite list field 405. The information element may comprise other field as well but they are not shown here. The cipher suite list field comprises a cipher suite type, which indicates use of a cellular network compatible cipher suite.

The message 401 of FIG. 4A may be for example a key frame, a beacon frame, or a probe frame.

Table 1 below shows cipher suite selectors for OLA/LAE according to an example embodiment. The table 1 is modified from the table defined in IEEE 802.11 v.2007, table 7-32 on page 125.

TABLE 1

| OUI | Suite type | Meaning |
| --- | --- | --- |
| 00-0F-AC | 0 | Use group cipher suite |
| 00-0F-AC | 1 | WEP-40 |
| 00-0F-AC | 2 | TKIP |
| 00-0F-AC | 3 | Reserved |
| 00-0F-AC | 4 | CCMP - default in RSNA |
| 00-0F-AC | 5 | WEP-104 |
| 00-0F-AC | 6-255 | Reserved |
| Vendor OUI | Other | Vendor-specific |
| Other | Any | Reserved |
| New value | New value | Use cellular compatible cipher suite (e.g. LTE compatible) |

In an example embodiment an EAPOL-Key message/frame is used when there is a need to exchange material that needs to be sent in secret. This material may be data or the key itself. The key may be a group key, a pairwise key or an STAkey (UE key), for example.

According to various embodiments of the invention, an EAPOL-Key message may be modified for the purposes of a WPA like, a TKIP like or an OLA like key delivery. When WPA or TKIP definition is used for OLA key delivery or more generally for cellular network compatible key delivery, OLA or cellular network compatible system is recognized from the cipher suite selector type, and the key carried in a key data field (in WPA or TKIP protocol formats) is a cellular network compatible key derived for example according to the embodiments disclosed herein.

Figure 4B:
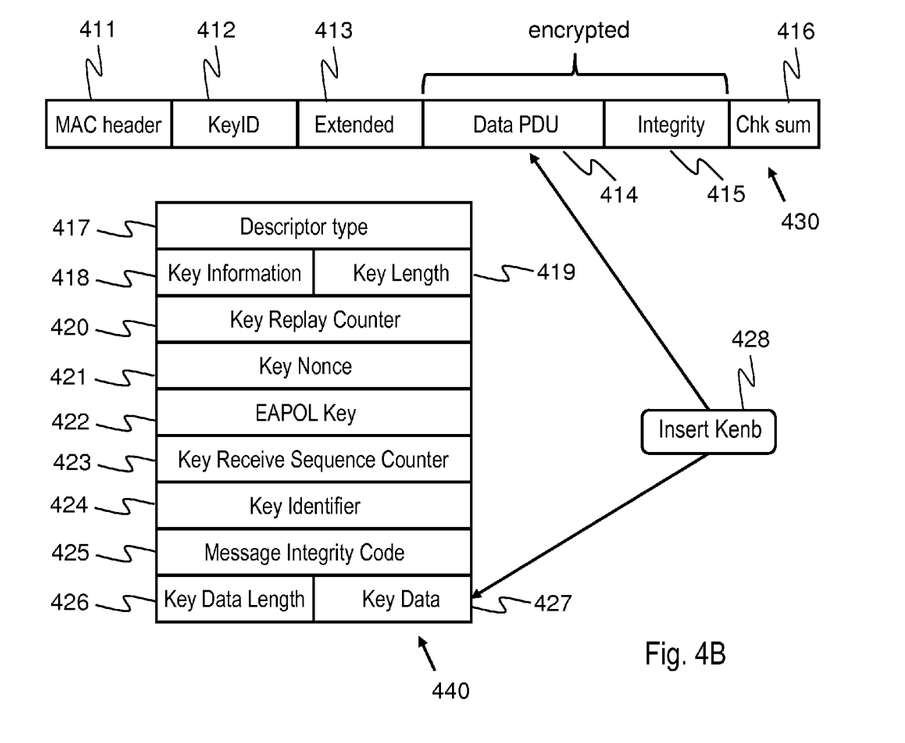
FIG. 4B shows examples of EAPOL-Key messages according to an example embodiment.

FIG. 4B shows examples of EAPOL-Key messages or frames 430 and 440 according to an example embodiment. The message 430 is a TKIP version of the EAPOL-Key description and the message 440 is a WPA version of the EAPOL-Key description.

Message 430 comprises following fields: MAC header 411, key ID 412, extended 413, data PDU 414, integrity 415, and check sum 416.

Message 440 comprises following fields: descriptor type 417, key information 418, key length 419, key replay counter 420, key nonce 421, EAPOL key 422, key receive sequence counter 423, key identifier 424, message integrity code 425, key data length 426, and key data 417.

In an example embodiment, an EAPOL-key data field 427 may carry the cellular network compatible cipher suite selection or the actual authentication key.

In an example embodiment, the key data field EAPOL-Key messages or frames is used differently for the pairwise key and group key handshakes. In the case of pairwise keys, the keys are computed independently by the supplicant and the authenticator (e.g. UE and access point). In this case, an RSN information element indicating cellular network compatible cipher suite is carried in the key data field 427. In the case of group keys, key data field 427 may carry the actual key. The key data field comprises information elements which specify the actual contents of the key data.

In the FIG. 4B, insert Kenb 428 illustrates a function of an example embodiment. The function inserts the authentication key itself with the key indicators, or it inserts the key indicators only, or it in particular inserts the fields which include at least the cellular network compatible cipher suite selector.

Embodiments of the present invention may be implemented in software, hardware, application logic or a combination of software, hardware and/or application logic. The software, application logic and/or hardware may reside on a communication apparatus (such as the user equipment 101 of FIG. 1A) or on an access point (such as the access point 104 of FIG. 1A).

In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5 below. The computer-readable medium may be a digital data storage such as a data disc or diskette, optical storage, magnetic storage, holographic storage, phase-change storage (PCM) or opto-magnetic storage. The computer-readable medium may be formed into a device without other substantial functions than storing memory or it may be formed as part of a device with other functions, including but not limited to a memory of a computer, a chip set, and a sub assembly of an electronic device.

Figure 5:
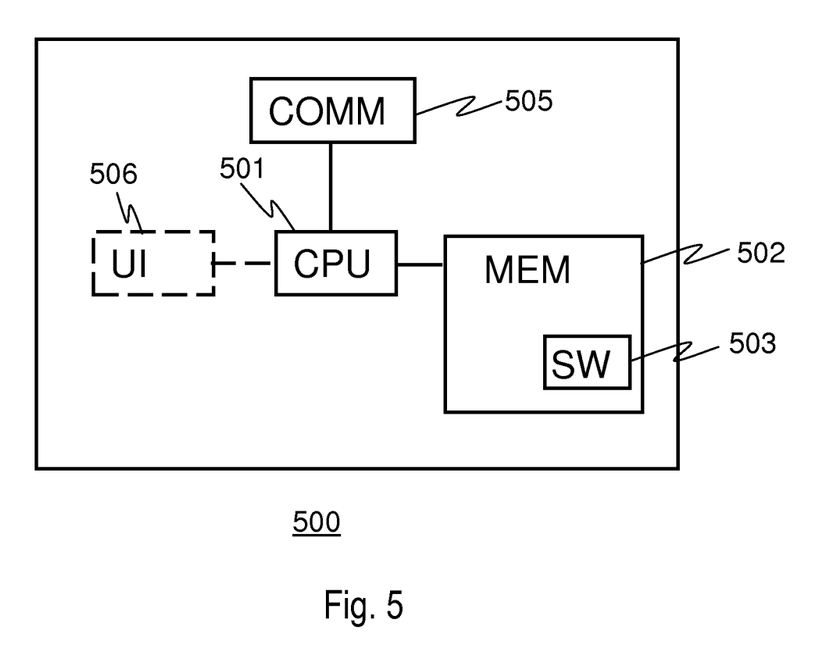
FIG. 5 shows a block diagram of an apparatus according to an example embodiment.

FIG. 5 shows an example block diagram of an apparatus 500 according to certain example embodiments of the invention. The apparatus 500 is suitable for functioning as the communication apparatus 101 or the access point 104 of FIG. 1A, for example. It may be a handheld wireless apparatus, such as a mobile phone, or a computer or server configured for specific purpose.

The apparatus 500 is a physically tangible object and comprises at least one memory 502 configured to store computer program code (or software) 503. The apparatus 500 further comprises at least one processor 501 configured to control the operation of the apparatus 500 using the computer program code 503, and a communication unit 505 configured to communicate with other entities or apparatuses. Additionally, the apparatus may comprise a user interface 506 (shown with dashed line). The user interface typically includes a display and keyboard or keypad for user interaction. It is not mandatory to have the user interface for the operation of embodiments of invention. Instead, controlling of the apparatus may be effected by means of a remote connection through the communication unit 505. The at least one processor 501 may be a master control unit (MCU). Alternatively, the at least one processor 501 may be a microprocessor, a digital signal processor (DSP), an application specific integrated circuit (ASIC), a field programmable gate array, a microcontroller or a combination of such elements. FIG. 5 shows one processor 501, but the apparatus 500 may comprise a plurality of processors 501.

The communication unit 505 may be, e.g., a radio interface module, such as a WLAN, Bluetooth, GSM/GPRS, CDMA, WCDMA, or LTE radio module. The communication unit 505 may be integrated into the apparatus 500 or into an adapter, card or the like that may be inserted into a suitable slot or port of the apparatus 500. The communication unit 505 may support one radio interface technology or a plurality of technologies. FIG. 5 shows one communication unit 505, but the apparatus 500 may comprise a plurality of communication units 505.

A skilled person appreciates that in addition to the elements shown in FIG. 5, the apparatus 500 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 500 may comprise a disposable or rechargeable battery (not shown) for powering the apparatus 500 when external power if external power supply is not available.

As to the operations of the embodiments of the invention, when the computer program code 503 is executed by the at least one processor 501, this causes the apparatus 500 to implement operations of a communication apparatus or operations of an access point. In detail, the processor 501 and program code, or computer program, 503, may initiate actions of the apparatus 500. For example, key generation according to example embodiments may be initiated.

By means of combining features of local area network authentication and cellular network compatible cipher suite as defined in various embodiments of the invention one may achieve efficient use of radio resources. Additionally, operator independent authorization systems may be used.

An embodiment of the invention enables use of cellular operator generated keys. Authentication keys may be certified in a cellular operator network and keys that are used in local area network(s) are derivatives of the keys certified in the cellular operator network, when connection to the MME by NAS signaling is feasible, according to the key hierarchy in E-UTRAN.

In an example embodiment of the invention key hierarchy of UTRAN with the key set KSI (key set identifier), IK (integrity key), CK (cipher key) is employed in local area network communication. In another example embodiment GSM/GERAN key set including derivation of Kc (cipher key) from IK (integrity key), CK (cipher key) is employed in local area network communication.

By means of using EAP-related keys local authorization e.g. by a Radius server is enabled. Local authorization is efficient for setting up local connections with low delays, or when executing handover procedures in a local subnet, for example. This also lets enterprises manage their own authorization practices. The use of certificates, where key derivation originates from an UICC (universal integrated circuit card), may be enabled even with local authorization.

Certain embodiments of the invention enable that an operator has a role in corporate local area networks. The following list identifies few examples:
  The operator provides access and connectivity services, but does not operate the corporate infrastructure (e.g. servers) as such.
  The operator provides authentication services so that it issues certificates and manages the user bases, user access rights and privileges and roaming agreements for the company employees. The operator does not necessarily have any other role in the local area network.
  The operator has a role in operating and/or owning at least a part of the communication infrastructure in the corporate premises.

In the following few example use cases employing certain embodiments of the invention are listed. These cases benefit from having cellular operator controlled authentication for local area access.

1) An operator provides a service to manage a corporate local area network. The operator installs and maintains the corporate WLAN network (or a wireless office), and manages the authorizations required for accessing the corporate WLAN network by itself or together with a corporate IT department. In this model, the operator may sell communication services to the employees of that corporate and the local area communication in the corporate buildings forms a cost reduced subset of overall subscription to communicate from any domestic or international place or while on the move. In this case, the operator may own the service model, but not necessarily the hardware infrastructure inside the corporate buildings. Alternatively, the operator may also own the IT hardware in the corporate premises and act as an IT house leasing the communication services to the corporate.

2) An operator provides authentication and billing services to a corporate, so that the corporate (or its IT department) sets up a WLAN network and manages it technically (separately in each of the corporate buildings). The operator provides in-house and on-the-move service packages that include a seamless authentication mechanism. This means that a user needs not bother much with the authentication, because it is based on certificates managed by the operator. Inside the corporate buildings, a WLAN is available, and it hence completes the operator's own (domestic wide area and roaming abroad) offering by the cellular network.

3) An operator provides certified access to a trusted (third party) WLAN network having a known or protected SSID name. The operator certificate can be used to access the trusted WLAN network. The WLAN network is not owned by the operator. Also other users than the customers of this operator may access and use the network, however their network authentication is not controlled by the operator and the level of security for the other users may not be as high as it is for the operator's own customers. Also, the operator authorization may be coupled to charging and quality preferences, so that if a contract between the third party WLAN provider and the operator exists, the customer of the operator may get higher preferences of the access rate. In addition, charging may happen via the operator. This may mean that the operators customer (end user or employer of the end user for example) may get discount of the access. Or even if the pricing of the access were the same, the actual billing may be simpler, and the WLAN access costs may be included in the regular communication bill by the operator. The operator may have agreements with several of such trusted third party WLAN providers.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention. It is also noted that the above embodiments are used merely to explain selected aspects or steps that may be utilized in implementations of the present invention. Some features may be presented only with reference to certain example embodiments of the invention. It should be appreciated that corresponding features may apply to other embodiments as well.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:
performing, by an apparatus, authentication key generation for local area network communication, said authentication key generation for the local area network communication comprising:
participating, by the apparatus, in communication of a message comprising a cipher suite selection type indicating cellular network compatible cipher suite;
creating, by the apparatus, cellular network compatible authentication keys according to said cipher suite selection type; and
using said cellular network compatible authentication keys for authentication in local area network,
wherein the cipher suite selection type is included in a robust security network information element.

2. The method of claim 1, wherein said participating in communication of said message comprising a cipher suite selection type indicating cellular network compatible cipher suite comprises receiving said message.

3. The method of claim 1, wherein said participating in communication of said message comprising a cipher suite selection type indicating cellular network compatible cipher suite comprises sending said message.

4. A method comprising:
performing, by an apparatus, authentication key generation for local area network communication, said authentication key generation for the local area network communication comprising:
participating, by the apparatus, in communication of a message comprising a cipher suite selection type indicating cellular network compatible cipher suite; and
creating, by the apparatus, cellular network compatible authentication keys according to said cipher suite selection type;
wherein the cipher suite selection type is included in robust security network information element.

5. A method comprising:
performing, by an apparatus, authentication key generation for local area network communication, said authentication key generation for the local area network communication comprising:
participating, by the apparatus, in communication of a message comprising a cipher suite selection type indicating cellular network compatible cipher suite; and
creating, by the apparatus, cellular network compatible authentication keys according to said cipher suite selection type;
wherein the cipher suite selection type is included in a key frame.

6. The method of claim 1, wherein the cipher suite selection type is included in a beacon frame.

7. The method of claim 1, wherein the cipher suite selection type is included in a probe frame.

8. The method of claim 4, wherein the robust security network information element is included in a key frame.

9. An apparatus comprising:
at least one processor; and
at least one memory including computer program code;
the at least one memory and the computer program code configured to, with the at least one processor, cause the apparatus to:
perform authentication key generation for local area network communication, said authentication key generation for the local area network communication comprising:
participating in communication of a message comprising a cipher suite selection type indicating cellular network compatible cipher suite;
creating cellular network compatible authentication keys according to said cipher suite selection type; and
using said cellular network compatible authentication keys for authentication in local area network,
wherein the cipher suite selection type is included in a robust security network information element.

10. The apparatus of claim 9, the at least one memory and the computer program code are configured to, with the at least one processor, cause the apparatus to: to participate in communication of said message comprising a cipher suite selection type indicating cellular network compatible cipher suite by receiving said message.

11. The apparatus of claim 9, the at least one memory and the computer program code are configured to, with the at least one processor, cause the apparatus to: to participate in communication of said message comprising a cipher suite selection type indicating cellular network compatible cipher suite by sending said message.

12. An apparatus comprising:
at least one processor; and
at least one memory including computer program code;
the at least one memory and the computer program code configured to, with the at least one processor, cause the apparatus to:
perform authentication key generation for local area network communication, said authentication key generation for the local area network communication comprising:

participating in communication of a message comprising a cipher suite selection type indicating cellular network compatible cipher suite; and creating cellular network compatible authentication keys according to said cipher suite selection type;

wherein the cipher suite selection type is included in robust security network information element.

13. An apparatus comprising:

at least one processor; and at least one memory including computer program code;

the at least one memory and the computer program code configured to, with the at least one processor, cause the apparatus to:

perform authentication key generation for local area network communication, said authentication key generation for the local area network communication comprising:

participating in communication of a message comprising a cipher suite selection type indicating cellular network compatible cipher suite; and creating cellular network compatible authentication keys according to said cipher suite selection type;

wherein the cipher suite selection type is included in a key frame.

14. The apparatus of claim 9, wherein the cipher suite selection type is included in a beacon frame.

15. The apparatus of claim 9, wherein the cipher suite selection type is included in a probe frame.

16. The apparatus of claim 12, wherein the robust security network information element is included in a key frame.

17. A computer program embodied on a non-transitory computer readable medium comprising computer executable program code which, when executed by at least one processor of an apparatus, causes the apparatus to perform:

performing authentication key generation for local area network communication, said authentication key generation for the local area network communication comprising:

participating in communication of a message comprising a cipher suite selection type indicating cellular network compatible cipher suite;

creating cellular network compatible authentication keys according to said cipher suite selection type; and using said cellular network compatible authentication keys for authentication in local area network, wherein the cipher suite selection type is included in a robust security network information element.

* * * * *